(12) United States Patent
Iijima (10) Patent No.: US 6,870,586 B2
(45) Date of Patent: Mar. 22, 2005

(54) LIQUID CRYSTAL DISPLAY DEVICE AND ELECTRONIC DEVICE

(75) Inventor: Chiyoaki Iijima, Ina (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/201,780

(22) Filed: Jul. 25, 2002

(65) Prior Publication Data

US 2003/0025863 A1 Feb. 6, 2003

(30) Foreign Application Priority Data

Jul. 27, 2001 (JP) .................................. 2001-228513
Sep. 14, 2001 (JP) .................................. 2001-279760

(51) Int. Cl.$^7$ ............................................. G02F 1/1335
(52) U.S. Cl. ........................... 349/114; 349/115; 349/96
(58) Field of Search ........................ 349/5, 9, 96, 115; 359/496–497, 489

(56) References Cited

U.S. PATENT DOCUMENTS 5,940,149 A * 8/1999 Vanderwerf .................... 349/5
6,400,432 B2   6/2002 Kuroiwa et al.

FOREIGN PATENT DOCUMENTS

| JP | A-3-105318 | 5/1991 |
|---|---|---|
| JP | A-3-105319 | 5/1991 |
| JP | A-7-270782 | 10/1995 |
| JP | 2000-2808 | * 1/2000 |
| JP | A 2000-221324 | 8/2000 |
| JP | A-2001-56463 | 2/2001 |
| JP | A-2001-504238 | 3/2001 |
| JP | A-2001-215509 | 8/2001 |
| JP | A-2001-512845 | 8/2001 |
| KR | 1999-0083623 | 11/1999 |
| KR | 2000-0057869 | 9/2000 |

* cited by examiner

*Primary Examiner*—Toan Ton
(74) *Attorney, Agent, or Firm*—Oliff & Berridge, PLC (57) ABSTRACT

The invention provides a liquid crystal display device which has excellent visibility and which provides a bright display by increasing the amount of light reflected in a direction of a line of sight of a user in a reflective or a transflective liquid crystal display device. The invention also, provides an electronic device including the same. The invention provides a liquid crystal display device including opposing upper and lower substrates liquid crystal sandwiched between the upper and lower substrates, and an upper polarizer (upper polarization layer) and a lower reflective polarization layer disposed above and below the liquid crystal, respectively. The lower reflective polarization layer is formed by stacking prism-shaped dielectric interference films having two types of wedge-shaped cross-section inclined surfaces formed continuously at regular intervals. Angles formed between each of the two types of inclined surfaces and the lower substrate are different. The invention also provides an electronic device including the liquid crystal display device.

11 Claims, 8 Drawing Sheets

LIQUID CRYSTAL DISPLAY DEVICE AND ELECTRONIC DEVICE

BACKGROUND OF THE INVENTION

1. Field of Invention

The present invention relates to a liquid crystal display device and an electronic device, and, more particularly, to a structure of a transflective liquid crystal display device which makes it possible to increase luminance in a direction of a line of sight of a user.

2. Description of Related Art

A reflective liquid crystal display device consumes little power because it does not have a light source such as a backlight, and has, from the past, been frequently used in various portable electronic devices, accessory display sections of devices, or the like.

However, since a reflective liquid crystal display device performs a displaying operation using outside light such as natural light or illumination light, it has a problem in that it is difficult to visually recognize what is displayed in dark places. To overcome this problem, there has been proposed a form of a liquid crystal display device which makes it possible to visually recognize what is displayed by using outside light in bright locations similarly to an ordinary reflective liquid crystal display device, and by using a light source disposed inside the display device in dark places. In other words, this liquid crystal display device uses displaying methods of both a reflective type and a transmissive type, so that, by switching a display mode to either a reflection mode or a transmission mode display type in accordance with the surrounding brightness, it is possible to provide a clear display even if the surrounding is dark while reducing power consumption. Hereunder, in the specification, this type of liquid crystal display device will be referred to as "transflective liquid crystal display device."

Figure 10:
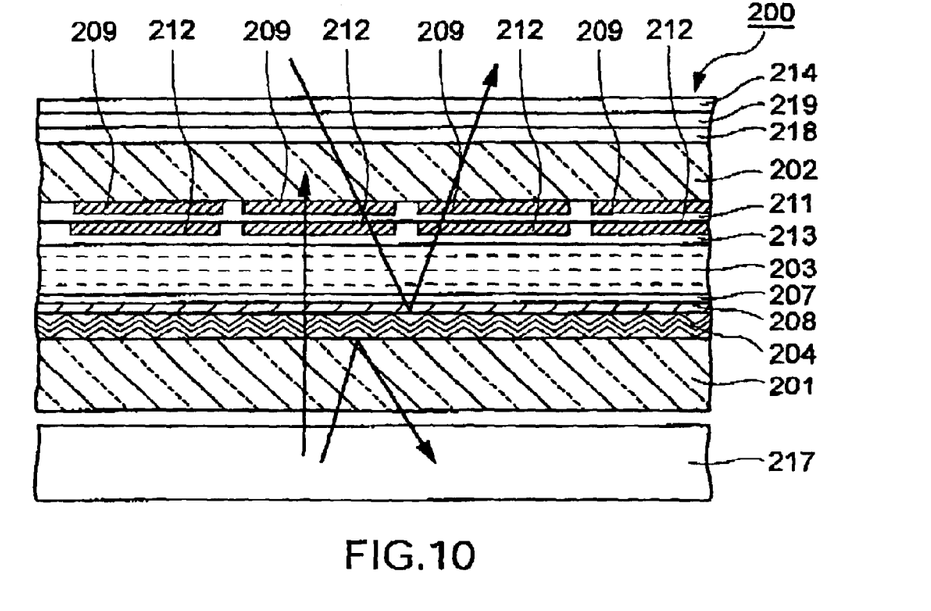
FIG. 10 is a partial sectional view of a related liquid crystal display device.

As one form of the transflective liquid crystal display device, a liquid crystal display device having the structure shown in FIG. 10 has been proposed. In a liquid crystal display device 200 shown in FIG. 10, liquid crystal 203 is sandwiched between a pair of upper and lower transparent substrates 201 and 202; a reflective polarization layer 204 and an insulating layer 206 are placed upon each other on the lower substrate 201; a stripe-shaped scanning electrode 208, formed of a transparent electrically conductive film formed of ITO or the like, is formed thereupon; and an alignment layer 207 is formed so as to cover the scanning electrode 208. On the other hand, color filters 209 are formed on the upper substrate 202; a planarizing film 211 is formed thereupon; and signal electrodes 212, formed of transparent electrically conductive films formed of ITO or the like, are formed on the planarizing film 211 in the form of stripes in a direction orthogonal to the scanning electrode 208; and an alignment layer 213 is formed so as to cover the signal electrodes 212. A forward scattering plate 218, a retardation film 219, and an upper polarizer 214 are disposed outwardly of the upper substrate 202 in that order from the upper substrate 202. A backlight 217 is disposed at the bottom surface side of the lower substrate 201.

Figure 11:
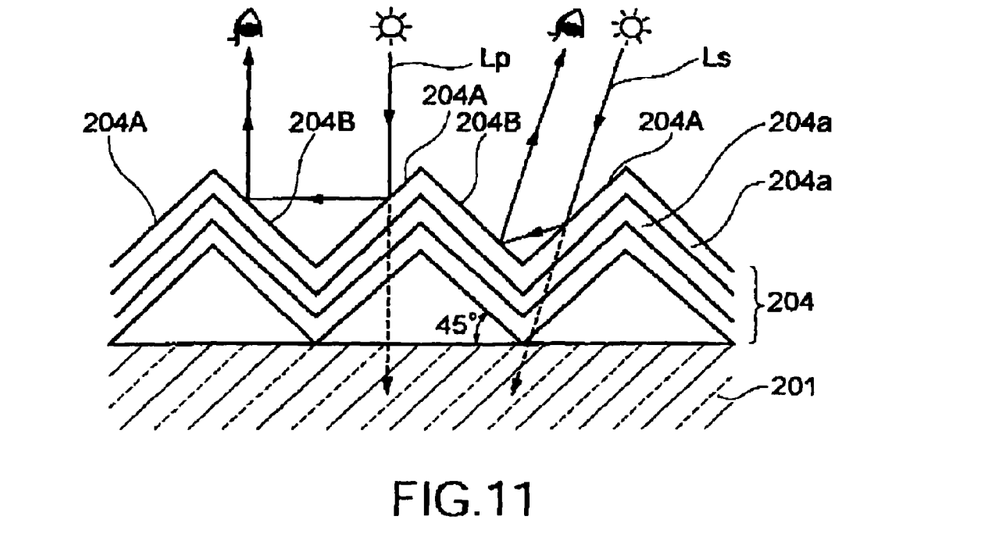
FIG. 11 illustrates a light path near a lower reflective polarization layer shown in FIG. 10.

Here, FIG. 11 is a side sectional view partly showing the reflective polarization layer 204 and the lower substrate 201 shown in FIG. 10. As shown in this figure, the reflective polarization layer 204 has a structure formed by stacking dielectric interference films 204a having the shape of a prism having a triangularly wavy form in cross section. For example, an Si layer and an $SiO_2$ layer are alternately stacked (three layers in FIG. 11) at a pitch of the order of 5 µm.

In the liquid crystal display device 200 having the above-described structure, when a displaying operation is performed in a reflection mode, light incident upon the display device 200 from above the upper substrate 202 passes through the liquid crystal 203 from the upper substrate 202 and reaches the reflective polarization layer 204. The light is reflected by the reflective polarization layer 204 and returns towards the upper substrate 202, so that the displaying operation by reflection is carried out. When a displaying operation is performed in a transmission mode, light is emitted from the backlight 205, and, of the portions of the light that have passed through the lower substrate 201, the portion of the light that is parallel to a polarization axis of the reflective polarization layer 204 passes therethrough and is used for the displaying operation.

Accordingly, according to the above-described liquid crystal display device 200, when outside light or light of the backlight 217 is used for the displaying operation, conversion from circularly polarized light to linearly polarized light or conversion from linearly polarized light to circularly polarized light does not occur, so that there is no loss of light caused by the conversion, thereby making it possible to provide a relatively bright display.

However, it has been found that although the above-described liquid crystal display device has high reflectivity, it does not provide a very bright display in the reflection mode. Therefore, the inventor has examined at length the state of reflection of light at the reflective polarization layer 204 in the liquid crystal display device 200, and has found out the following. More specifically, the reflective polarization layer 204 has the shape of a triangularly wavy prism as shown in FIG. 11. In the reflective polarization layer 204, two types of inclined surfaces 204A and 204B are alternately formed at regular intervals. The angle between each of these two types of inclined surfaces 204A and 204B and the lower substrate 201 is 45 degrees. Therefore, when light Lp incident upon the reflective polarization layer 204 from a direction normal to the lower substrate 201 is such that a portion thereof (s wave) is reflected by an inclined surface 204A and travels towards a corresponding inclined surface 204B, and a portion thereof (p wave) passes through the inclined surface 204A and travels towards the lower substrate 201. The reflected portion of the light (s wave) is reflected by the inclined surface 204B, travels in the direction normal to the lower substrate 201, and is used for display. Light Ls incident upon the reflective polarization layer 204 obliquely from above the lower substrate 201 is similarly reflected by an inclined surface 204A and a corresponding inclined surface 204B in that order and exits from the reflective polarization layer 204 in a direction opposite to the incidence direction. Therefore, in order to cause a large amount of light to exit in a direction of a line of sight of a user, it is necessary for the direction of incidence of the light and the direction of the line of sight of the user to be the same. In such an arrangement, since outside light is caused to be incident upon the liquid crystal display device from behind the user, the incident light may be blocked by the user, thereby making the display darker.

The present invention has been achieved in view of the above-described circumstances. It is an object of the present invention to provide a liquid crystal display device which has excellent visibility and which realizes a bright display by increasing the amount of light reflected in a direction of a line of sight of a user in a reflective or a transflective liquid crystal display device.

It is another object of the present invention to provide an electronic device comprising the liquid crystal display device having the above-described excellent characteristics.

SUMMARY OF THE INVENTION

To overcome the above-described problems, according to the present invention, there is provided a liquid crystal display device comprising opposing upper and lower substrates, liquid crystal sandwiched between the upper and lower substrates, and an upper polarization layer and a lower reflective polarization layer disposed above and below the liquid crystal, respectively. In the liquid crystal display device, the lower reflective polarization layer is formed by stacking prism-shaped dielectric interference films having two types of wedge-shaped cross section inclined surfaces formed continuously at regular intervals, and angles formed between each of the two types of inclined surfaces and the lower substrate are different.

In other words, in the liquid crystal display device of the present invention, by forming the reflective polarization layer, formed by stacking prism-shaped dielectric interference films upon each other, into the shape of an inclined prism, a direction of incidence of outside light and an exiting direction of reflected light are made different and the exiting direction of the reflected light and a direction of a line of sight of a user are made the same, thereby increasing the amount of light in the direction of the line of sight of the user. The operation of the liquid crystal display device of the present invention will be described in detail below with reference to FIGS. 4 and 5.

Figure 4:
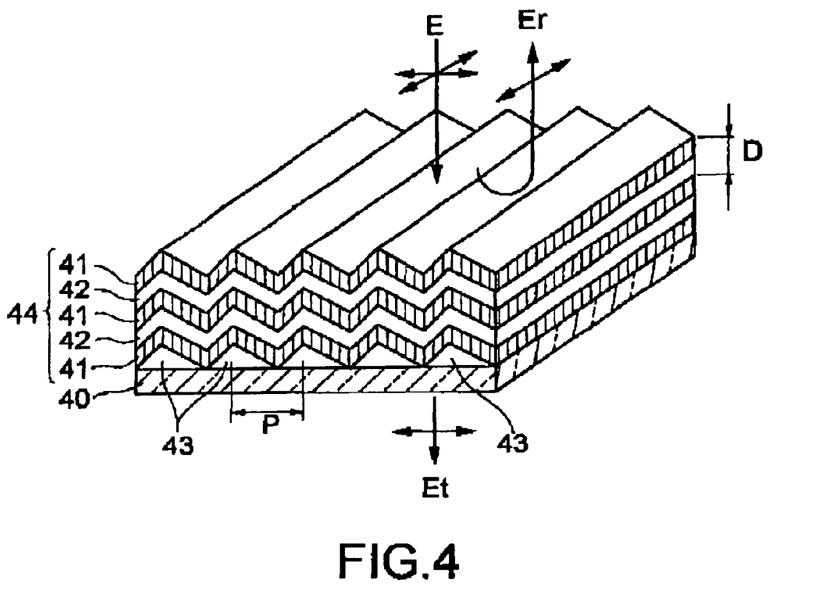
FIG. 4 illustrates a light path near a lower reflective polarization layer shown in FIG. 3.

As the lower reflective polarization layer used in the present invention, a reflective polarization layer having the structure shown in FIG. 4 is used. FIG. 4 is a perspective view of an example of a reflective polarization layer formed by stacking dielectric interference films having a prism shape that has a triangularly wavy form in cross section.

A reflective polarization layer 44 shown in FIG. 4 is what is called a three-dimensional photonic crystal layer, which is formed by alternately stacking and forming a plurality of layers 41 and 42, formed of dielectric interference films, upon each other on parallel triangular prism-shaped resinous layers 43 formed on a substrate 40. In this way, light propagation characteristics of the photonic crystal, formed by stacking prism-shaped layers upon each other, is anisotropic. When natural light is incident upon the reflective polarization layer 44 from the illustrated top side thereof, a component Et which is perpendicular to a stripe-shaped groove of the reflective polarization layer 44 is such as to pass through the reflective polarization layer 44 and a component Er which is parallel to the groove is such as to be reflected thereby. In other words, the reflective polarization layer 44 shown in FIG. 4 has a reflection axis parallel to the direction of the groove, and a polarization axis perpendicular to the direction of the groove. The light Et which has passed through the reflective polarization layer 44 becomes polarized light perpendicular to the groove of the reflective polarization layer 44 and the reflected light Er becomes polarized light parallel to the groove.

A stacking pitch D of the layers 41 and 42 and a pitch P of the resinous layers 43 formed on the substrate 40 (pitch of the grooves of the reflective polarization layer 44) are adjusted to optimum values as required in accordance with the intended characteristics of the reflective polarization layer 44. In other words, the transmittance ratio (reflectance ratio) of the reflective polarization layer 44 having the above-described structure can be controlled by the number of stacks of the layers 41 and 42, so that, by decreasing the number of stacks, the light transmittance ratio of the light component parallel to the reflection axis (direction of the grooves of the reflective polarization layer 44) is increased, thereby making it possible to decrease the reflectance ratio. When the number of stacks is equal to or greater than a predetermined number of stacks, the light component parallel to the reflection axis is such as to be totally reflected.

Although there is given a description of the case where, in FIG. 4, the reflective polarization layer 44 is formed by stacking the aforementioned dielectric interference films 41 and 42 upon each other on the triangular cross-section resinous layers 43 provided on a surface of the smooth substrate 40 using photo-curing or thermosetting resin, a reflective polarization layer may be formed by stacking dielectric interference films upon each other on a substrate having grooves formed at regular intervals in a surface thereof.

Figure 5:
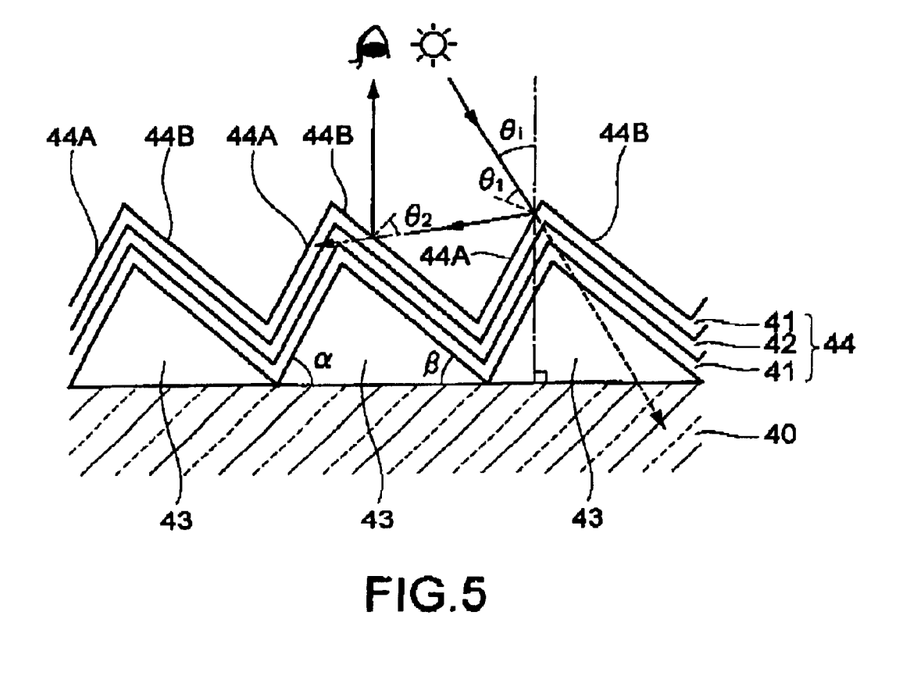
FIG. 5 is a perspective view of the structure of a lower reflective polarization layer used in the present invention.

Next, a description of the operation of the lower reflective polarization layer used in the present invention will be given with reference to FIG. 5. FIG. 5 illustrates a light path when the reflective polarization layer shown in FIG. 4 is applied to the lower substrate of the liquid crystal display device, and is a partial sectional view of the lower reflective polarization layer (reflective polarization layer) 44 and the lower substrate (substrate) 40. As shown in this figure, the lower reflective polarization layer 44 comprises two types of inclined surfaces 44A and 44B disposed at regular intervals in the form of a triangular wave. In the liquid crystal display device according to the present invention, an inclination angle α between each inclined surface 44A and the lower substrate 40 and an inclination angle β between each inclined surface 44B and the lower substrate 40 are made different. By this structure, the direction of incidence of outside light and the exiting direction of light reflected by the lower reflective polarization layer 44 can be made different, so that, as in the liquid crystal display device shown in FIG. 10, the direction of incidence of the outside light and the exiting direction of the reflected light will not be the same. Therefore, the display will not become dark due to blocking of the outside light by the user.

By setting the inclination angles α and β at proper values, the direction of the exiting light with respect to the direction of incidence of the outside light can be controlled, so that, for example, if the user views the liquid crystal display device from the front side, it is possible to increase the amount of light visually recognized by the user by setting the direction of the exiting light in a direction normal to the liquid crystal display device. Therefore, it is possible to provide a bright display even if the reflectance ratio is the same.

The light path in the lower reflective polarization layer shown in FIG. 5 is such that, first, light incident upon the lower substrate 40 at an incidence angle $\theta_i$ is incident upon an inclined surface 44A with the inclination angle α at an incidence angle $\theta_1$. A portion (s wave) of the incident light is reflected by the inclined surface 44A and travels towards an inclined surface 44B, and a portion of the incident light passes through the inclined surface 44A and becomes a light portion (p wave) which travels towards the lower substrate 40.

Then, similarly, a portion of light incident upon the inclined surface 44B at an incidence angle $\theta_2$ is reflected and a portion of the incident light passes through the inclined surface 44B. The portion of the light reflected by the inclined surface 44B exits upward from the lower reflective polarization layer 44 as exiting light.

As described above, since a portion of the light incident upon the lower reflective polarization layer 44 is transmitted when the incident light is reflected by the inclined surfaces 44A and 44B, it is desirable that the amount of reflected light be maximized in order to increase the brightness of the display in a reflection mode. More specifically, it is desirable that the inclination angles α and β be set so that the incidence angle $\theta_1$ with respect to the inclined surface 44A and the incidence angle $\theta_2$ with respect to the inclined surface 44B become Brewster angles (polarization angles). By using such a structure, almost all of a polarization component parallel to the inclined section 44A that is incident thereupon and a polarization component parallel to the inclined surface 44B that is incident thereupon can be reflected, so that the amount of light which can be used for display can be maximized. Therefore, it possible to maximize the brightness of the display by reflection. These incidence angles α and β are suitably set at optimum values based on the incidence angle $\theta_i$ of outside light and the direction of the line of sight of the user. These angles are not particularly limited to certain values. More specifically, in the case where the incidence angle $\theta_i$ of outside light is 15 degrees, when the direction of the line of sight of the user is substantially in the direction normal to the liquid crystal display device, α=55°±5° and β=45°±5°. In the case where the incidence angle $\theta_i$ of outside light is 30 degrees, when the direction of the line of sight of the user is substantially in the direction normal to the liquid crystal display device, α=70°±5° and β=35°±5°.

In the above description, only the reflection of light by the reflective polarization layer 44 is described in detail. As described above, however, the reflective polarization layer 44 has a polarization axis orthogonal to the reflection axis, so that it can be used as a transflective film. In other words, when the liquid crystal display device comprises an illuminating device at the outer surface side thereof, it is possible to form a transflective liquid crystal display device.

Next, the liquid crystal display device of the present invention may be constructed so that the lower reflective polarization layer is a transflective polarization layer which has a polarization axis and a reflection axis orthogonal to the polarization axis and which reflects a portion of a component of incident light parallel to the reflection axis and passes a portion thereof, and so that a lower polarization layer is provided below the lower reflective polarization layer. This structure will be described in more detail below with reference to FIG. 6.

Figure 6:
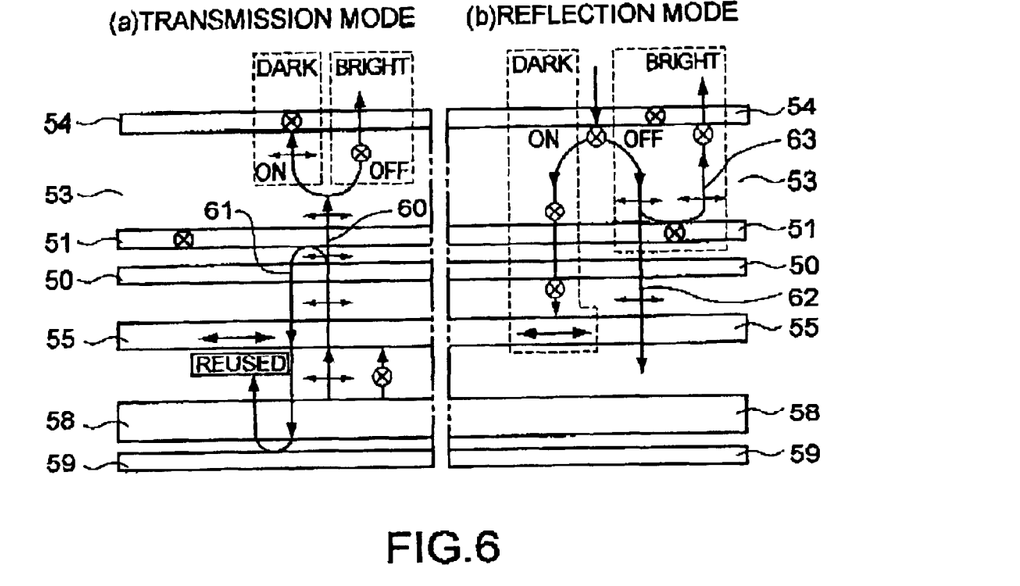
FIGS. 6(a) and 6(b) illustrate the principle of operation of a liquid crystal display device of the present invention, with FIG. 6(a) illustrating the principle of operation in a transmission mode and FIG. 6(b) illustrating the principle of operation in a reflection mode.

Hereunder, the principle of operation of the liquid crystal display device having this structure will be described. FIG. 6 illustrates the principle of operation when the present invention is applied to a semi-transmissive liquid crystal display device. FIG. 6(a) illustrates a light path in a transmission mode, and FIG. 6(b) illustrates a light path in a reflection mode. In these figures, only those structural elements of the liquid crystal display device of the present invention that are required to describe the principle of operation are shown. An upper polarizer 54 and a lower reflective polarization layer 51 are provided at the top side and the bottom side of liquid crystal 53, a lower substrate 50 is disposed at the outer side of the lower reflective polarization layer 51, and a lower polarization layer 55 is formed at the outer side of the lower substrate 50. An illuminating device 58 is provided at the outer side (illustrated bottom surface side) of the lower polarization layer 55, and a reflective plate 59 is provided at the outer surface side of the illuminating device 58.

The upper polarizer 54 has a polarization axis in a direction perpendicular to the plane of the sheet on which the figure is drawn, and the lower polarization layer 55 has a polarization axis parallel to the plane of the sheet on which the figure is drawn. The lower reflective polarization layer 51 is a transflective polarization layer, and has a polarization axis in a direction perpendicular to the plane of the sheet on which the figure is drawn and a reflection axis orthogonal to the polarization axis. The lower reflective polarization layer 51 is such as to pass almost all of the polarized light parallel to the polarization axis, and reflects a portion of polarized light parallel to the reflection axis and passes a portion thereof.

In other words, the lower reflective polarization layer 51 is also a transflective layer with respect to polarized light parallel to the reflection axis thereof. The lower reflective polarization layer 51 has a structure which is the same as that of the reflective polarization layer 44 shown in FIG. 4, with the polarization axis being disposed so as to be perpendicular to the plane of the sheet on which the figure is drawn. In other words, the grooves of the reflective polarization layer 44 shown in FIG. 4 are disposed so as to be parallel to the plane of the sheet on which FIG. 6 is drawn.

Hereunder, a displaying operation in the transmission mode shown in FIG. 6(a) will be described.

In the liquid crystal display device of the present invention, a display operation in the transmission mode is performed by making use of light emitted from the illuminating device 58. The light emitted from the illuminating device 58 is converted into polarized light parallel to the plane of the sheet on which the figure is drawn by the lower polarization layer 55 having a polarization axis parallel to the plane of the sheet on which the figure is drawn. Thereafter, the light passes through the lower substrate 50 and is incident upon the lower reflective polarization layer 51. As mentioned above, the lower reflective polarization layer 51 has a polarization axis perpendicular to the plane of the sheet on which the figure is drawn. A portion of the polarized light parallel to the plane of the sheet on which the figure is drawn produced by the lower polarization layer 55 is reflected and is converted into reflected light 61 which returns towards the illuminating device 58, and a portion of the polarized light passes through the lower reflective polarization layer 51 and is converted into transmitted light 60 which is incident upon the liquid crystal 53.

Next, when a voltage is applied to the liquid crystal 53 (on state), the transmitted light 60 incident upon the liquid crystal 53 reaches the upper polarizer 54 with the transmitted light 60 almost without being influenced by the action of the liquid crystal 53, and is absorbed by the upper polarizer 54 having a polarization axis perpendicular to the plane of the sheet on which the figure is drawn, so that pixels provide a dark display. On the other hand, when a voltage is not applied to the liquid crystal 53 (off state), the transmitted light 60 incident upon the liquid crystal 53 is converted into polarized light that is perpendicular to the plane of the sheet on which the figure is drawn by optical rotation of the liquid crystal 53, and the polarized light reaches the upper polarizer 54. Then, the light which is polarized light parallel to the polarization axis of the upper polarizer 54 passes through the upper polarizer 54, so that the pixels provide a bright display.

Here, when one looks at the reflected light 61 reflected at the back surface (the lower substrate 50 side) of the lower reflective polarization layer 51, the reflected light 61 passes through the lower substrate 50 and the lower polarization layer 55 and returns towards the illuminating device 58, is reflected by the reflective plate 59 disposed at the outer surface side of the illuminating device 58, and is reused as light that travels again towards the lower polarization layer 55. Then, the light reaches the lower reflective polarization layer 51 again. A portion of the light passes through the lower reflective polarization layer 51 and is incident upon the liquid crystal 53, while a portion of the light is reflected thereby and returns towards the illuminating device 58. In this way, the light that is reflected by the lower reflective polarization layer 51 passes through the lower reflective polarization layer 51 as it is repeatedly reflected between the lower reflective polarization layer 51 and the reflective plate 59, so that the light is used for a displaying operation. Therefore, in the liquid crystal display device of the present invention, of the portions of the light emitted from the illuminating device 58, the portion of the light that has passed through the lower polarization layer 55 can be maximally used, so that a bright display can be realized.

Next, a description of the case where a displaying operation is performed in the reflection mode shown in FIG. 6(b) will be given.

As shown in FIG. 6(b), light that is incident upon the upper polarizer 54 from thereabove is first converted into polarized light perpendicular to the plane of the sheet on which the figure is drawn by the upper polarizer 54 having a polarization axis that is perpendicular to the plane of the sheet on which the figure is drawn, and the polarized light is incident upon the liquid crystal 53. Then, when the liquid crystal is in an on state, the incident light reaches the lower reflective polarization layer 51 almost without being influenced by the action of the liquid crystal 53. Then, since the lower reflective polarization layer 51 has a polarization axis perpendicular to the plane of the sheet on which the figure is drawn and a reflection axis parallel to the plane of the sheet on which the figure is drawn, the light that has reached the lower reflective polarization layer 51 passes through the lower reflective polarization layer 51. Thereafter, the light passes through the lower substrate 50 and is absorbed by the lower polarization layer 55 having a polarization axis parallel to the plane of the sheet on which the figure is drawn, so that the pixels provide a dark display.

On the other hand, when the liquid crystal 53 is in an off state, the light that is incident upon the liquid crystal 53 is converted into polarized light parallel to the plane of the sheet on which the figure is drawn by optical rotation of the liquid crystal 53, and the polarized light reaches the lower reflective polarization layer 51. A portion of this light is reflected by the lower reflective polarization layer 51 having a reflection axis parallel to the plane of the sheet on which the figure is drawn and is defined as reflected light 63, and a portion of this light passes through the lower reflective polarization layer 51 and is defined as transmitted light 62. The reflected light 63 incident upon the liquid crystal 53 again is converted again into polarized light perpendicular to the plane of the sheet on which the figure is drawn by optical rotation of the liquid crystal 53, and the polarized light passes through the upper polarizer 54, so that the pixels provide a bright display. The transmitted light 62 that has passed through the lower reflective polarization layer 51 passes through the lower substrate 50 and the lower polarization layer 55, and exits towards the illuminating device 58. Since the reflective plate 59 is provided at the illuminating device 58, a portion of the transmitted light 62 is reflected by the reflective plate 59 and returns towards the lower substrate 50. When this portion of the light is incident upon the liquid crystal 53, the pixels that provide a bright display become brighter, so that the light that has passed through the lower reflective polarization layer 51 does not adversely affect the display.

As shown in FIG. 6, in the liquid crystal display device of the present invention, when bright displays are provided, the liquid crystal 53 is in an off state in both the transmission mode and the reflection mode, whereas, when dark displays are provided, the liquid crystal 53 is in an on state in both the transmission mode and the reflection mode. Accordingly, by causing the states of application of voltage to the liquid crystal to be the same in both the transmission mode and the reflection mode for the bright displays and for the dark displays, when a display in the transmission mode is realized, it is possible to prevent a reduction in contrast caused by impingement of outside light, so that a display with excellent visibility can be provided.

This is due to the following reason. If, in the transmission mode and in the reflection mode, the states of application of voltage to the liquid crystal are made different for the bright displays and for the dark displays, the state of application of voltage to the liquid crystal with regard to the pixels that provide a dark display in the transmission mode and the state of application of voltage to the liquid crystal with regard to the pixels that provide a bright display in the reflection mode become the same. Therefore, in the case where outside light is incident upon the liquid crystal display device when the liquid crystal display device operates in the transmission mode, at the pixels that provide a dark display, the light is reflected by the lower reflective polarization layer 51 and exits therefrom to the outside, so that the pixels that normally provide a dark display provides a bright display. This reduces contrast in the liquid crystal display device.

Next, the liquid crystal display device of the present invention may be constructed so that the lower reflective polarization layer is partly provided at the inside surface side of the lower substrate, and so that the lower polarization layer is provided at the bottom side of the lower reflective polarization layer. Even if the liquid crystal display device is constructed in this way, it is possible to realize a transflective liquid crystal display device. Hereunder, the operation of such a liquid crystal display device will be described with reference to FIG. 7.

Figure 7:
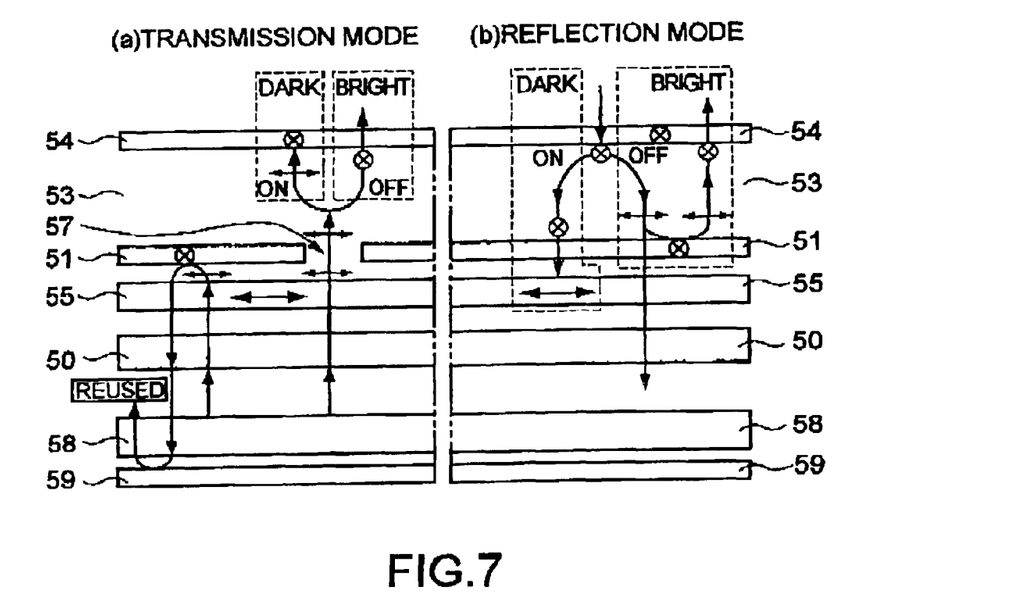
FIGS. 7(a) and 7(b) illustrate the principle of operation of a liquid crystal display device of the present invention, with FIG. 7(a) illustrating the principle of operation in a transmission mode and FIG. 7(b) illustrating the principle of operation in a reflection mode.

FIG. 7 illustrates the principle of operation of a transflective liquid crystal display device of the present invention. The liquid crystal display device shown in this figure comprises an upper polarizer plate 54 and a lower reflective polarization layer 51, which are disposed above and below liquid crystal 53. It also comprises a lower polarization layer 55 and a lower substrate 50, which are disposed below the lower reflective polarization layer 51, and an illuminating device 58 and a reflective plate 59, which are provided outwardly of the lower substrate 50. Further, in the liquid crystal display device having this structure, an opening 57 for passing light emitted from the illuminating device 58 is formed in the lower reflective polarization layer 51. The other structural features are the same as those of the liquid crystal display device shown in FIG. 4. Of the component parts shown in FIG. 7, the component parts given the same reference numerals as those shown in FIG. 6 are the same as those shown in FIG. 6 and are not described in detail below.

In the liquid crystal display device shown in FIG. 7, when a displaying operation is performed in a transmission mode, as shown in FIG. 7(a), light emitted from the illuminating device 58 passes through the lower substrate 50 and is, then, converted into polarized light parallel to the plane of the sheet on which the figure is drawn by the lower polarization layer 50. Thereafter, a portion of the polarized light passes through the opening 57 and is incident upon the liquid crystal 53, so that it is used for the displaying operation. When the liquid crystal 53 is in an on state, the light incident upon the liquid crystal 53 reaches the upper polarizer 54 almost without being affected by the action of the liquid crystal 53, and is absorbed by the upper polarizer 54 having a polarization axis perpendicular to the plane of the sheet on which the figure is drawn, so that pixels provide a dark display. On the other hand, when the liquid crystal 53 is in an off state, the light is converted from polarized light parallel to the plane of the sheet on which the figure is drawn to polarized light perpendicular to the plane of the sheet on which the figure is drawn by optical rotation of the liquid crystal. Then, the polarized light passes through the upper polarizer 54, so that the pixels provide a bright display.

Light which has been reflected at the bottom surface of the lower reflective polarization layer 51 without being incident upon the opening 57 of the lower reflective polarization layer 51 returns towards the illuminating device 58, is reflected by the reflective plate 59 disposed at the outer surface side of the illuminating device 58, and is caused to be incident upon the lower reflective polarization layer 51 again. As the light is repeatedly reflected between the lower reflective polarization layer 51 and the reflective plate 59 in this way, the light is incident upon the opening 57, and is used for the displaying operation.

Therefore, by this structure, a bright display is provided particularly in the transmission mode, so that it is possible to provide a liquid crystal display device having excellent visibility.

When the liquid crystal display device shown in FIG. 7 performs a displaying operation in the reflection mode, as shown in FIG. 7(b), outside light incident upon the upper polarizer 54 from thereabove is converted into polarized light perpendicular to the plane of the sheet on which the figure is drawn by the upper polarizer 54 and is incident upon the liquid crystal 53. Here, when the liquid crystal 53 is in an on state, the incident light reaches the lower reflective polarization layer 51 almost without being affected by the action of the liquid crystal 53, and passes through the lower reflective polarization layer 51 having a polarization axis perpendicular to the plane of the sheet on which the figure is drawn to reach the lower polarization layer 55. Then, the light is absorbed by the lower polarization layer 55 having a polarization axis parallel to the plane of the sheet on which the figure is drawn. Accordingly, the pixels provide a dark display.

On the other hand, when the liquid crystal 53 is in an off state, the incident light is converted into polarized light parallel to the plane of the sheet on which the figure is drawn by optical rotation of the liquid crystal 53. The polarized light reaches the lower reflective polarization layer 51, is reflected by the lower reflective polarization layer 51 having a polarization axis perpendicular to the plane of the sheet on which the figure is drawn (reflection axis parallel to the plane of the sheet on which the figure is drawn), and travels towards the liquid crystal 53. By optical rotation of the liquid crystal 53, the light is converted again into polarized light perpendicular to the plane of the sheet on which the figure is drawn, and the polarized light passes through the upper polarizer 54 having a polarization axis perpendicular to the plane of the sheet on which the figure is drawn, and exits therefrom in the upward direction. Accordingly, the pixels provide a bright display.

Even in the above-described liquid crystal display device, as with the lower reflective polarization layer 44 shown in FIG. 5, two types of inclined surfaces which form the lower reflective polarization layer 51 are formed with different inclination angles, so that the direction of incidence of outside light and the exiting direction of reflected light can be made different. By controlling these inclination angles at proper values, the amount of light exiting in the direction of the line of sight of a user is increased, thereby making it possible to substantially increase the brightness of the display.

Next, in the liquid crystal display device of the present invention, it is desirable that the angle between one of the two types of inclined surfaces and the lower substrate be from 20 degrees to 50 degrees inclusive, and the angle between the other of the two types of inclined surfaces and the lower substrate be from 50 degrees to 80 degrees inclusive. It is more desirable that the angle between one of the two types of inclined surfaces and the lower substrate be from 30 degrees to 50 degrees inclusive, and the angle between the other of the two types of inclined surface and the lower substrate be from 50 to 75 degrees inclusive. By forming the liquid crystal display device with such a structure, when a displaying operation is performed by reflection using the liquid crystal display device of the present invention for a display section of an electronic device such as a cellular phone, the amount of light in the direction of the line of sight of a person using the electronic device can be increased, so that a substantially bright display can be provided.

In, for example, a cellular phone, the angle of incidence of outside light during use is usually from about 20 to 45 degrees, and the user is positioned virtually at the front side of the display section. Since the refractive index of the material used to form the liquid crystal display device is about 1.5, when the angle of incidence with respect to the liquid crystal display device is about 20 to 45 degrees, the angle of incidence with respect to the inclined portions is about 15 to 30 degrees. When the direction of reflection of light with an incidence of angle of 15 degrees with respect to the inclined portions is defined as the direction normal to the liquid crystal display device, if the inclination angles of the corresponding inclined surfaces are 45°±5° and 55°±5°, respectively, the exiting direction of reflected light can be set in the direction of the user, so that it is most desirable that these inclination angles be set at these values. When the direction of reflection of light with an angle of incidence of 30 degrees with respect to the inclined portions is defined as the direction normal to the liquid crystal display device, if the inclination angles of the corresponding inclined surfaces are 35°±5° and 70°±5°, respectively, the exiting direction of reflected light can be set in the direction of the user, so that it is most desirable that these inclination angles be set at these values. However, although the positional relationship between the user, the display section (liquid crystal display device), and the outside light is basically as mentioned above, the user actually using the display section uses it by moving it at a position which allows the user to get the brightest display. Therefore, when the inclination angles of the inclined surfaces are within the aforementioned ranges, the user can practically use the display section by finely adjusting the position of the display section. It is not desirable for the inclination angles to fall outside the aforementioned ranges because a sufficiently bright display cannot be realized even if the position of the display section is finely adjusted by the user.

Next, in the liquid crystal display device of the present invention, it is desirable that the polarization axis of the lower reflective polarization layer and the polarization axis of the lower polarization layer be disposed substantially orthogonal to each other. In the liquid crystal display devices shown in FIGS. 6 and 7, when a displaying operation in the reflection mode is performed, light that has passed through the lower reflective polarization layer 51 is absorbed by the lower polarization layer 55, so that the pixels provide a dark display. Therefore, when the polarization axis of the lower reflective polarization layer 51 and the polarization axis of the lower polarization layer 55 are orthogonal to each other, almost all of the light that has passed through the lower reflective polarization layer 51 is absorbed by the lower polarization layer 55, so that the dark display can be made darker. Therefore, a clear display can be achieved by increasing contrast in the reflection mode.

Next, in the liquid crystal display device of the present invention, the angle between the polarization axis of the lower reflective polarization layer and the polarization axis of the lower polarization layer may be from 60 degrees to 120 degrees inclusive. Although, as described above, it is most desirable that the polarization axes of the lower reflective polarization layer and the lower polarization layer be disposed orthogonal to each other, the liquid crystal display device can be practically used as long as the angle therebetween falls within the aforementioned range. It is not desirable that the angle of intersection between them fall outside the aforementioned range because a reduction in contrast in the reflection mode occurs.

Next, it is desirable that the liquid crystal display device of the present invention comprise a light-scattering layer, disposed above the lower reflective polarization layer, for scattering light reflected by the lower reflective polarization layer. By such a structure, the intensity of light reflected by the lower reflective polarization layer becomes locally large, so that it is possible to prevent a reduction in visibility of the display in the reflection mode. It is sufficient that the light-scattering layer be provided at least above the lower reflective polarization layer. A forward scattering plate may be provided as a light-scattering layer outwardly of the upper substrate, or light-scattering plates may be provided at the inner surface sides of the upper or lower substrates.

The liquid crystal display device of the present invention may comprise color filters at the inner surface of the upper substrate or the lower substrate. By such a structure, a reflective or a transflective color liquid crystal display device can be provided. Although the color filters may also be formed at the inner surface side of the upper substrate, it is desirable that the color filters be formed directly above the lower reflective polarization layer. When the color filters are disposed directly above the lower reflective polarization layer, a clear color display can be provided by restricting color shifts and parallax.

Figure 8:
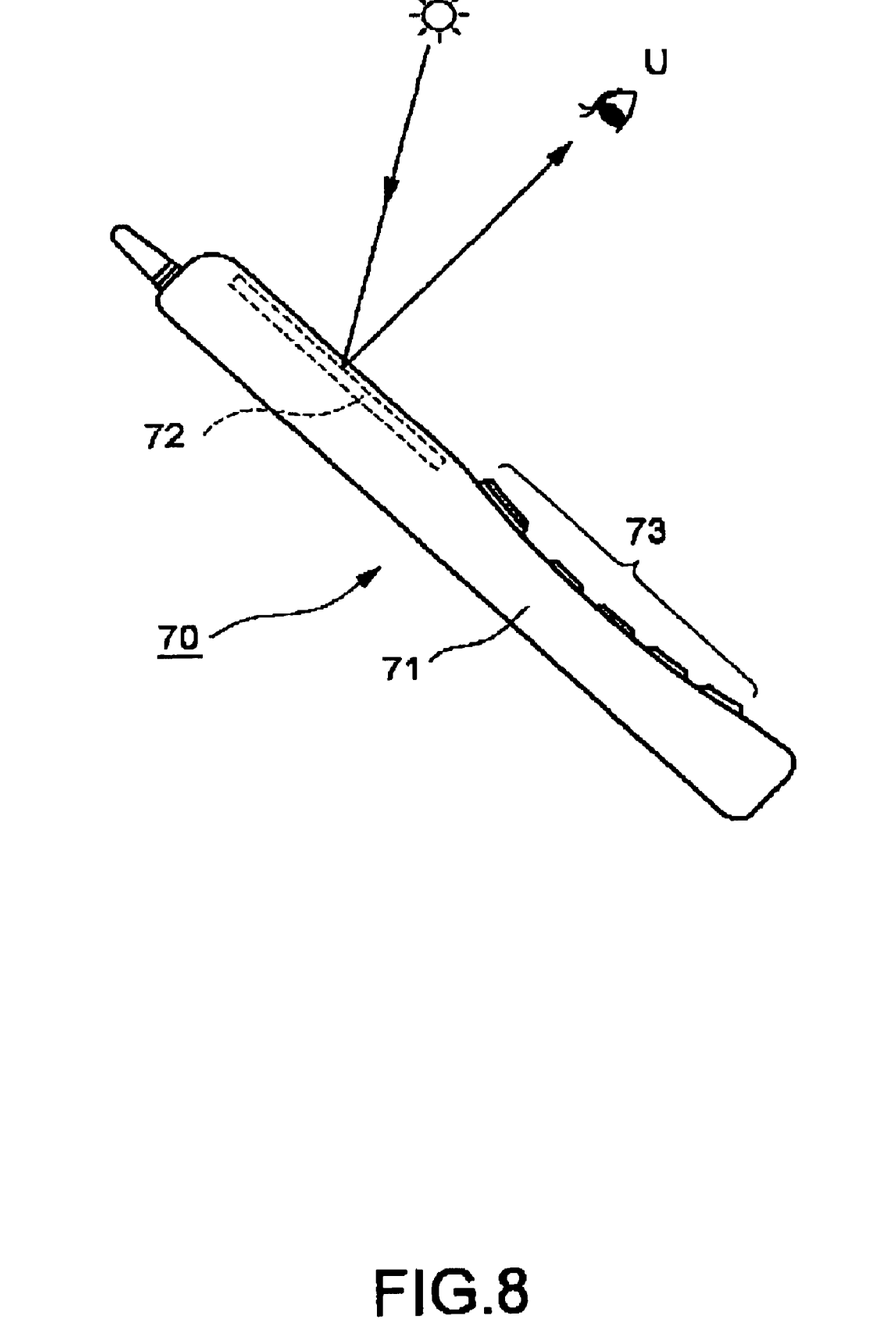
FIG. 8 illustrates the operation of an electronic device of the present invention.

An electronic device of the present invention comprises any one of the above-described liquid crystal display devices. According to this structure, it is possible to realize an electronic device including an excellent display section which is substantially bright in a reflection mode. FIG. 8 illustrates the operation of an electronic device of the present invention. Here, the operation of a cellular phone, taken as an example of the electronic device, will be described.

A cellular phone 70 shown in FIG. 8 comprises a display section 72 and an operating section 73, disposed at a housing 71, with the display section 72 being formed using any one of the liquid crystal display devices of the present invention.

In the cellular phone 70, light incident upon the display section 72 obliquely from thereabove is reflected towards a user U at the front side of the display section 72, so that a bright display can be provided in the direction of the user.

DETAILED DESCRIPTION OF PREFERRED EMBODIMENTS

Hereunder, a description of embodiments of the present invention will be given with reference to the drawings.

First Embodiment

Figure 1:
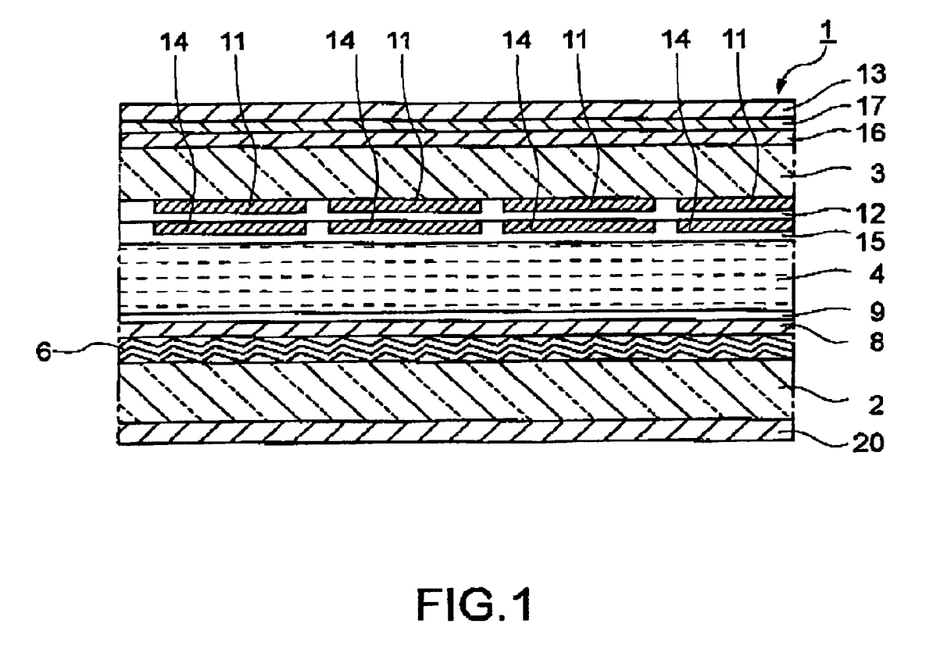
FIG. 1 is a partial cross-sectional structural view of a reflective liquid crystal display device of a first embodiment of the present invention.

FIG. 1 is a partial sectional view of a reflective liquid crystal display device of a first embodiment of the present invention. The liquid crystal display device of the embodiment is a passive-matrix-type transflective color liquid crystal display device. In order to make it easier to see the figures referred to below, the dimensional ratios, film thicknesses of corresponding structural component parts, etc., are appropriately made different.

As shown in FIG. 1, a liquid crystal display device 1 of the embodiment has a general structure in which a lower substrate 2 and an upper substrate 3 are disposed so as to oppose each other, and STN (super twisted nematic) liquid crystal 4 is provided in a space between the upper and lower substrates 2 and 3.

A lower reflective polarization layer 6, which has the same structure as that shown in FIG. 4, is formed on the inside surface of the lower substrate 2 formed of glass, resin, or the like. A stripe-shaped scanning electrode 8, formed of a transparent electrically conductive film formed of ITO or the like, extends along the lower reflective polarization layer 6 in the horizontal direction in FIG. 1. An alignment layer 9, formed of polyimide or the like, is placed upon the scanning electrode 8 so as to cover it. A light-absorbing layer 20, formed of light-absorbable material, is provided on the outer surface of the lower substrate 2.

The lower reflective polarization layer 6 can be formed by placing upon each other, for example, $Ta_2O_5$ and $SiO_2$ at a stacking pitch of the order of 3 μm, with the pitch between grooves being of the order of 2 μm. The materials used to form the lower reflective polarization layer 6 are not limited to those mentioned above, so that, for example, Si and $TiO_2$ may be used, and the stacking pitch may be appropriately changed in accordance with the materials used to form the lower reflective polarization layer 6.

Red, green, and blue color filters 11 are repeatedly provided in that order on the inner surface of the upper substrate 3, formed of, for example, glass or resin. They extend in a direction perpendicular to the plane of the sheet on which the figure is drawn so as to be orthogonal to the scanning electrode 8, provided on the lower substrate 2. A planarizing film 12 for smoothening the bumpy portion formed by these color filters 11 is placed on top of the color filters 11. Stripe-shaped signal electrodes 14, formed of transparent electrically conductive films formed of ITO or the like, are provided on the planarizing film 12 so as to extend perpendicular to the plane of the sheet on which the figure is drawn. An alignment layer 15, formed of polyimide or the like, is placed and formed on the scanning electrodes 14. Outwardly of the upper substrate 3, a forward scattering plate 16, a retardation film 17, and an upper polarizer 13 are placed upon each other in that order on the upper substrate 3.

The liquid crystal display device of this embodiment having the above-described basic structure is constructed so that the lower reflective polarization layer 6 is formed on the inside of the lower substrate 2, and so that the lower reflective polarization layer 6 has two types of prism-shaped inclined surfaces forming the prismatic shape thereof which have different inclination angles. Therefore, according to the reflective liquid crystal display device of the embodiment, the exiting direction of reflected light with respect to incident light can be arbitrarily set. For example, an exiting direction of reflected light is set in the direction of a line of sight of a user, so that a substantially bright display is provided. Since light which has passed through the lower reflective polarization layer 6 is absorbed by the light-absorbing layer 20 provided at the outer surface of the lower substrate 2, and does not return towards the liquid crystal 4, it is possible to make a dark display even darker, so that a display by reflection with excellent contrast can be provided.

Second Embodiment

Figure 2:
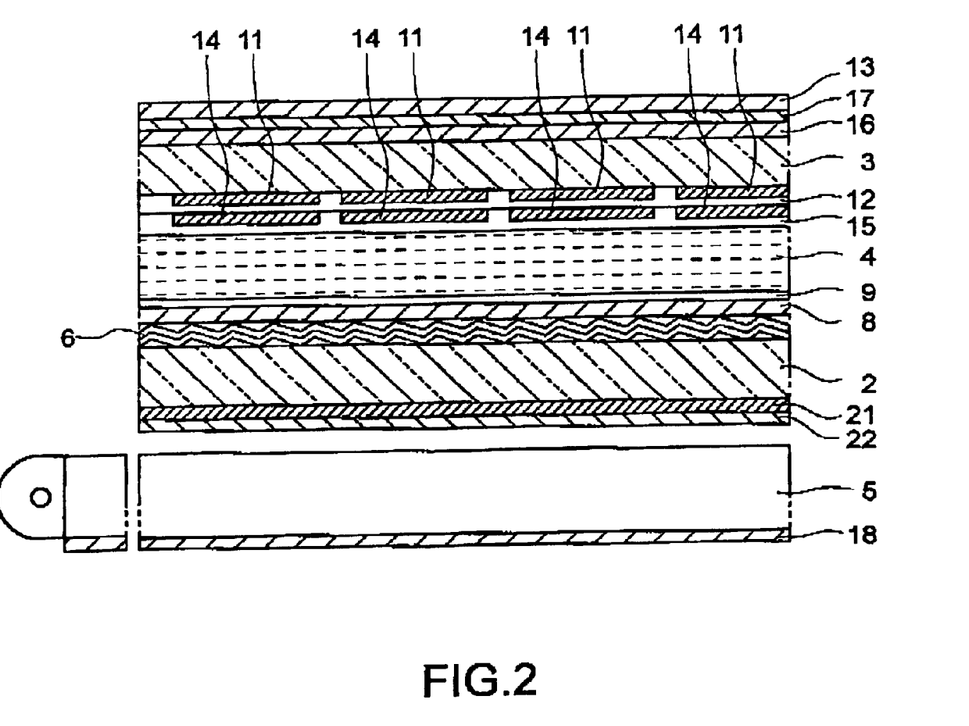
FIG. 2 is a partial cross-sectional structural view of a transflective liquid crystal display device of a second embodiment of the present invention.

FIG. 2 is a partial sectional view of a transflective liquid crystal display device of a second embodiment of the present invention. The liquid crystal display device shown in FIG. 2 differs from the reflective liquid crystal display device shown in FIG. 1 in that a lower polarizer (lower polarization layer) 21 and a reflective polarizer 22 are placed upon each other in that order outwardly of a lower substrate 2, in that a backlight (illuminating device) 5 is provided outwardly of the reflective polarizer 22, and in that a reflective plate 18 is disposed at the outer surface of the backlight 5. The other structural features are the same as those of the liquid crystal display device shown in FIG. 1.

Accordingly, of the structural elements shown in FIG. 2, those structural elements that are the same as those shown in FIG. 1 are given the same reference numerals, so that the details thereof are not given below.

The liquid crystal display device of the embodiment is a transflective liquid crystal display device which can be used by switching between a reflection mode in which outside light is used and a transmission mode in which the backlight 5 is a light source. The principle of operation thereof is the same as that of the liquid crystal display device shown in FIG. 6. In a displaying operation by reflection using outside light, since, as in the liquid crystal display device of the first embodiment, two types of inclined surfaces which form the prismatic shape of a lower reflective polarization layer 6 are formed with different inclination angles, an exiting direction of reflected light with respect to incident light can be properly set, so that the amount of light reflected in a direction of a line of sight of a user is increased, thereby making it possible to provide a substantially bright display.

Even in the transmission mode in which the backlight 5 is used as the light source, by reusing light reflected at the bottom surface of the lower reflective polarization layer 6, the efficiency with which the light source is used is increased, so that it is possible to provide a bright display. In other words, the reflective polarizer 22, provided at the outer surface of the lower polarizer 21, is disposed so that its polarization axis is substantially parallel to the polarization axis of the lower polarizer 21. By this, light emitted from the backlight 5 is converted into polarized light parallel to the polarization axis of the reflective polarizer 22, and almost all of the polarized light passes through the lower polarizer 21. The state of polarization of light reflected by the reflective polarizer 22 is changed as it is repeatedly reflected between the reflective plate 18, provided at the backlight 5, and the reflective polarizer 22, so that it can pass through the reflective polarizer 22. Therefore, the reflected light can also be used for the displaying operation.

Further, in the transflective liquid crystal display device of the embodiment, since, in the transmission mode and the reflection mode, the states of application of voltage to the liquid crystal for dark displays and for bright displays are the same, even if outside light is incident upon the liquid crystal display device during operation in the transmission mode, contrast provided by the liquid crystal display device is not reduced. Accordingly, the liquid crystal display device of the embodiment has excellent visibility in both the transmission mode and the reflection mode.

Third Embodiment

Figure 3:
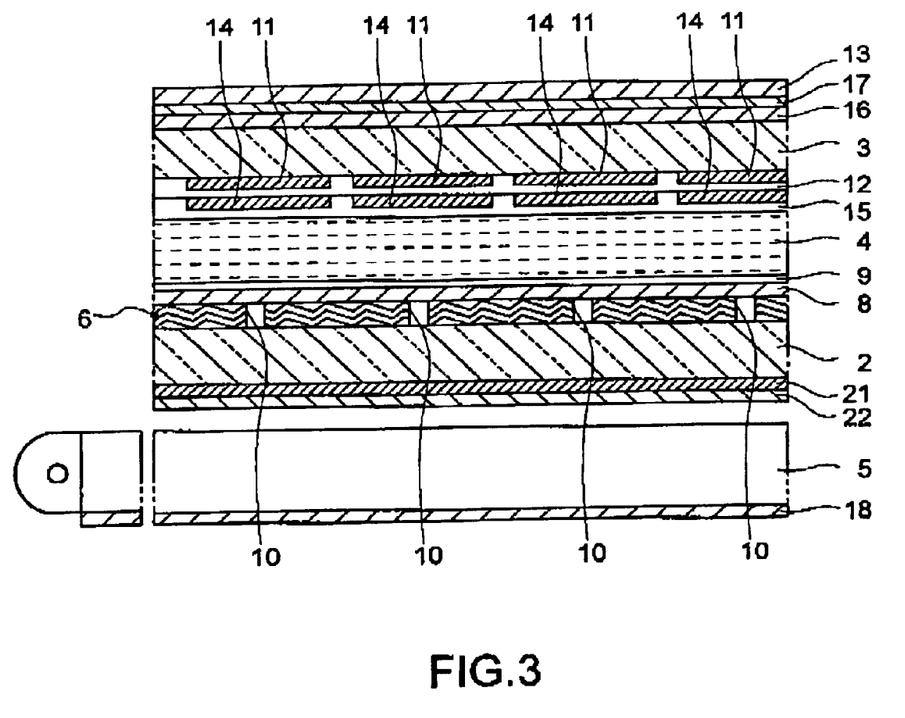
FIG. 3 illustrates the principle of operation of a liquid crystal display device of the present invention.

FIG. 3 is a partial sectional view of a transflective liquid crystal display device of a third embodiment of the present invention. The only difference between the liquid crystal display device shown in FIG. 3 and the transflective liquid crystal display device shown in FIG. 2 is that the liquid crystal display device shown in FIG. 3 has an opening 10 formed in a lower reflective polarization layer 6 in order to pass light emitted from a backlight 5. The other structural features are the same as those of the liquid crystal display device shown in FIG. 2. Therefore, of the structural elements shown in FIG. 3, those structural elements that are the same as those shown in FIG. 2 are given the same reference numerals, and the details thereof will not be given below.

The principle of operation of the liquid crystal display device of this embodiment shown in FIG. 3 is the same as that of the liquid crystal display device shown in FIG. 7. As in the liquid crystal display device of the second embodiment, in a reflection mode, by causing an exiting direction of reflected light to be the same as a direction of a line of sight of a user, the brightness of the display which is visually recognized by the user is increased. In a transmission mode, by increasing the efficiency with which light of the backlight 5 is used, a bright display is realized.

(Electronic Device)

A description of an electronic device comprising the liquid crystal display device of any one of the above-described embodiments will be given.

Figure 9:
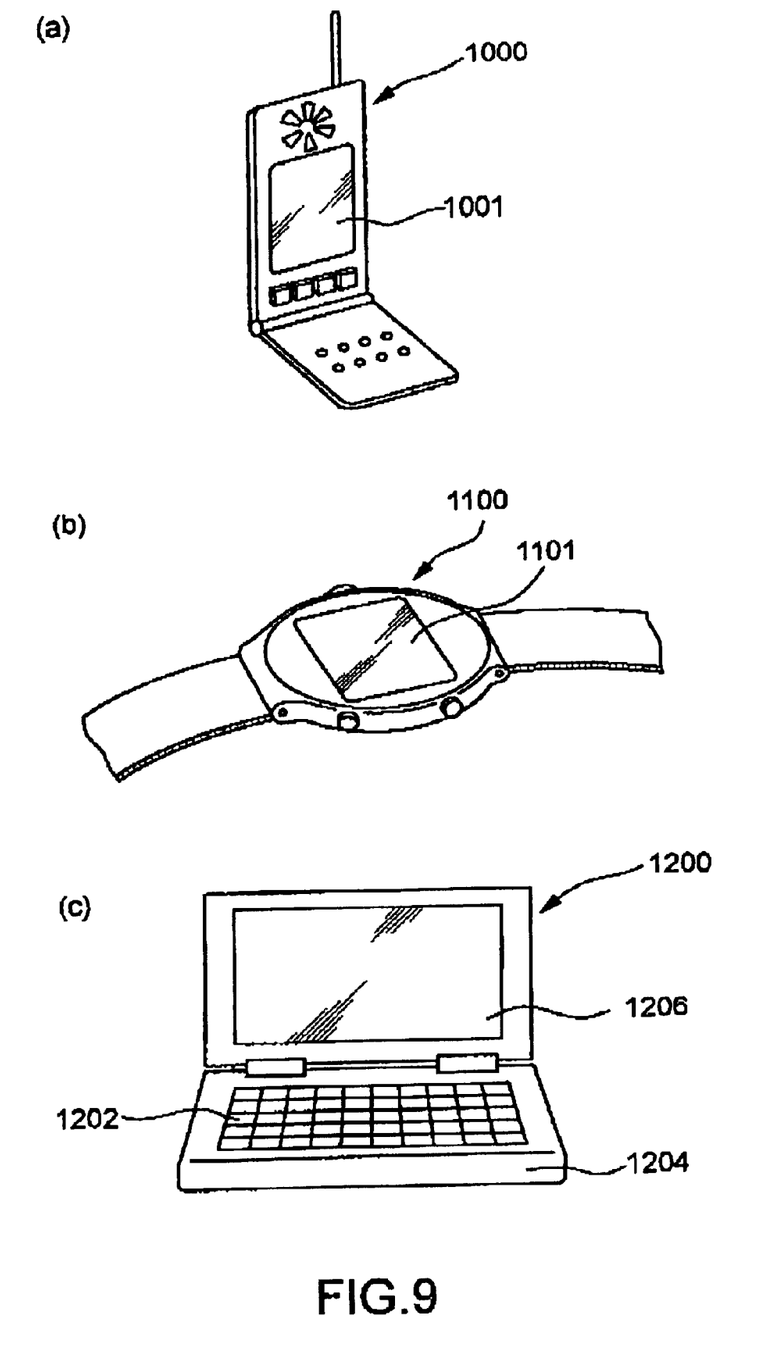
FIGS. 9(a) to 9(c) are perspective views of examples of electronic devices of the present invention.

FIG. 9(*a*) is a perspective view of a cellular phone. In FIG. 9(*a*), reference numeral 1000 denotes the body of the cellular phone, and reference numeral 1001 denotes a liquid crystal display section using any one of the above-described liquid crystal display devices.

FIG. 9(b) is a perspective view of a wristwatch electronic device. In FIG. 9(b), reference numeral 1100 denotes the body of the wristwatch, and reference numeral 1101 denotes a liquid crystal display section using any one of the above-described liquid crystal display devices.

FIG. 9(c) is a perspective view of a portable information processor, such as a word processor or a personal computer. In FIG. 9(c), reference numeral 1200 denotes the information processor; reference numeral 1202 denotes an input section, such as a keyboard; reference numeral 1204 denotes the body of the information processor; and reference numeral 1206 denotes a liquid crystal display section using any one of the above-described liquid crystal display devices.

By installing a liquid crystal display section using the liquid crystal display device of any one of the above-described embodiments in the electronic devices shown in FIGS. 9(a) to 9(c), the amount of light reflected in the direction of the line of sight of the user is increased, so that the electronic devices make it possible to substantially increase the brightness of the display in the reflection mode.

[Advantages]

As described in detail above, the liquid crystal display device of the present invention comprises opposing upper and lower substrates, liquid crystal sandwiched between the upper and lower substrates, and an upper polarization layer and a lower reflective polarization layer disposed above and below the liquid crystal, respectively, wherein the lower reflective polarization layer is formed by stacking prism-shaped dielectric interference films having two types of wedge-shaped cross section inclined surfaces formed continuously at regular intervals, and wherein angles formed between each of the two types of inclined surfaces and the lower substrate are different. By this structure, by causing a direction of incidence of outside light and an exiting direction of reflected light to be different, and by causing the exiting direction of reflected light and a direction of a line of sight of a user to be the same, the amount of light in the direction of the line of sight of the user can be increased, thereby making it possible to substantially increase the brightness of the display in a reflection mode.

By installing a liquid crystal display section using a liquid crystal display device of any one of the above-described embodiments in an electronic device of the present invention, the amount of light reflected in the direction of the line of sight of the user is increased, so that, according to the electronic device of the present invention, the brightness of the display in a reflection mode can be substantially increased.

What is claimed is:

1. A liquid crystal display device, comprising:
opposing upper and lower substrates;
a liquid crystal sandwiched between the upper and lower substrates;
an upper polarization layer and a lower reflective polarization layer disposed above and below the liquid crystal, respectively, the lower reflective polarization layer being formed by stacking dielectric interference films, the lower reflective polarization layer having two types of inclined surfaces joined at opposing ends at regular intervals to form a non-symmetrical triangular wave, an inclination angle formed between the respective one of the two types of inclined surfaces that form the non-symmetrical triangular wave and the lower substrate being different for the two types of inclined surfaces that are joined at the opposing ends, the lower reflective polarization layer being a transflective polarization layer which has a polarization axis and a reflection axis orthogonal to the polarization axis and which reflects a portion of a component of incident light parallel to the reflection axis and passes a portion of the component of the incident light parallel to the reflection axis therethrough; and
a lower polarization layer disposed below the lower reflective polarization layer.

2. The liquid crystal display device according to claim 1, the lower reflective polarization layer being partly provided at an inside surface side of the lower substrate, and the liquid crystal display device further including a lower polarization layer provided below the lower reflective polarization layer.

3. The liquid crystal display device according to claim 1, an angle between one of the two types of inclined surfaces and the lower substrate being from 20 degrees to 50 degrees inclusive, and an angle between the other of the two types of inclined surfaces and the lower substrate being from 50 degrees to 80 degrees inclusive.

4. The liquid crystal display device according to claim 1, a polarization axis of the lower reflective polarization layer and a polarization axis of the lower polarization layer being disposed substantially orthogonal to each other.

5. The liquid crystal display device according to claim 4, an angle between the polarization axis of the lower reflective polarization layer and the polarization axis of the lower polarization layer being from 60 degrees to 120 degrees inclusive.

6. The liquid crystal display device according to claim 1, further comprising a scattering layer, disposed above the lower reflective polarization layer, to scatter light reflected by the lower reflective polarization layer.

7. The liquid crystal display device according to claim 1, further comprising a color filter provided at at least one of an inside surface side of the upper substrate and an inside surface side of the lower substrate.

8. An electronic device, comprising: the liquid crystal display device of claim 1.

9. A liquid crystal display device, comprising:
opposing first and second substrates;
parallel resin layers formed on the second substrate, each resin layer having a prism shape of unequal sides of unequal angles;
a liquid crystal sandwiched between the first and second substrates;
an upper polarization layer and a reflective polarization layer disposed on opposite sides of the liquid crystal, the reflective polarization layer being formed by stacking dielectric interference films on the parallel resin layers, each dielectric interference film of the reflective polarization layer having two types of inclined surfaces of unequal inclination with respect to the second substrate, the reflective polarization layer being a transflective polarization layer which has a polarization axis and a reflection axis orthogonal to the polarization axis and which reflects a portion of a component of incident light parallel to the reflection axis and passes a portion of the component of the incident light parallel to the reflection axis therethrough; and
a lower polarization layer disposed below the reflective polarization layer.

10. A liquid crystal display device, comprising:
opposing first and second substrates;

a liquid crystal sandwiched between the first and second substrates;

an upper polarization layer and a reflective polarization layer disposed on opposite sides of the liquid crystal, the reflective polarization layer including dielectric interference films in prism-shaped stacks aligned parallel with each other, each stack having two types of inclined surfaces that connect at a peak of the each stack and at valleys in between stacks and that are continuous with inclined surfaces of adjacent stacks, the two types of inclined surfaces forming different angles with the second substrate, the reflective polarization layer being a transflective polarization layer which has a polarization axis and a reflection axis orthogonal to the polarization axis and which reflects a portion of a component of incident light parallel to the reflection axis and passes a portion of the component of the incident light parallel to the reflection axis therethrough: and a lower polarization layer disposed below the reflective polarization layer.

11. A liquid crystal display device, comprising:

opposing first and second substrates;

a liquid crystal sandwiched between the first and second substrates;

a polarization layer disposed between the first substrate and the liquid crystal; and a reflective polarization layer disposed between the second substrate and the liquid crystal, the reflective polarization layer including:

a first dielectric interference film having an upper surface formed from repeating prism shapes joined at valleys between adjacent prism shapes, each prism shape having a first inclined surface and a second inclined surface joined together at a peak of the corresponding prism shape, the first inclined surface forming a first angle with the second substrate, the second inclined surface forming a second angle with the second substrate, the first angle and the second angle being different from each other; and a second dielectric interference film stacked with the first dielectric interference film, the second dielectric interference film having an upper surface parallel with the upper surface of the first dielectric interference film.

* * * * *